United States Patent
Chung et al.

(10) Patent No.: US 11,754,864 B2
(45) Date of Patent: Sep. 12, 2023

(54) ELECTRO-OPTICAL INTENSITY MODULATION APPARATUS, CHIP AND SYSTEM

(71) Applicant: POLARIS PHOTONICS LIMITED, Taipei (TW)

(72) Inventors: Hung-Pin Chung, Taipei (TW); Tsung-Yeh Ho, Taipei (TW); Kuang-Hsu Huang, Taipei (TW); Sung-Lin Yang, Taipei (TW); Yin-Wu Chen, Taipei (TW); Hou-Chung Hung, Taipei (TW)

(73) Assignee: Polaris Photonics Limited, Taipei (TW)

( * ) Notice: Subject to any disclaimer, the term of this patent is extended or adjusted under 35 U.S.C. 154(b) by 281 days.

(21) Appl. No.: 17/329,564

(22) Filed: May 25, 2021

(65) Prior Publication Data
US 2022/0299802 A1 Sep. 22, 2022

(30) Foreign Application Priority Data
Mar. 19, 2021 (TW) .................. 110110094

(51) Int. Cl.
*G02F 1/035* (2006.01)
*G02F 1/225* (2006.01)

(52) U.S. Cl.
CPC .......... *G02F 1/0356* (2013.01); *G02F 1/0353* (2013.01); *G02F 1/225* (2013.01)

(58) Field of Classification Search
CPC ....... G02F 1/0356; G02F 1/0353; G02F 1/225
(Continued)

(56) References Cited

U.S. PATENT DOCUMENTS

| | | | |
|---|---|---|---|
| 4,709,978 A | 12/1987 | Jackel | |
| 5,140,654 A | 8/1992 | Akasaka et al. | |

(Continued)

FOREIGN PATENT DOCUMENTS

| | | |
|---|---|---|
| CN | 212009207 U | 11/2020 |
| JP | 2008046573 A | 2/2008 |
| TW | 1540357 B | 7/2016 |

OTHER PUBLICATIONS

"Single Mach-Zehnder Modulator with Active Y-branch for Higher than 60 dB Extinction-Ratio Operation" by Yamaguchi et al, 39th European Conference and Exhibition on Optical Communication (Year: 2013).*

(Continued)

*Primary Examiner* — Robert Tavlykaev
(74) *Attorney, Agent, or Firm* — Rosenberg, Klein & Lee

(57) ABSTRACT

An electro-optical intensity modulation apparatus has a non-linear optical substrate and electrodes. The non-linear optical substrate is provided with a first branch waveguide, a second branch waveguide, a first channel waveguide and a second channel waveguide thereon. The first channel waveguide and the second channel waveguide are disposed between the first branch waveguide and the second branch waveguide, and the first channel waveguide and the second channel waveguide are branched from the first branch waveguide and converged at the second branch waveguide. The electrodes are disposed on an area between the first branch waveguide and the second branch waveguide to make the first channel waveguide, the second channel waveguide and the electrodes form a radio frequency conversion push-pull electro-optic phase modulation unit, a push-pull electro-optic bias control unit, two sets of independent polarization rotation control units and a dual-channel relative light intensity ratio adjustment unit, which are sequentially connected.

20 Claims, 7 Drawing Sheets

(58) Field of Classification Search
USPC .......................................................... 385/1–3
See application file for complete search history.

(56) References Cited

U.S. PATENT DOCUMENTS

| | | |
|---|---|---|
| 6,334,005 B1 | 12/2001 | Burie et al. |
| 6,535,653 B1 * | 3/2003 | Hung ..................... G02F 1/225 |
| | | 385/40 |
| 6,567,599 B2 | 5/2003 | Hung |
| 6,714,706 B2 * | 3/2004 | Kambe ................. G02F 1/3136 |
| | | 385/9 |
| 7,400,786 B1 | 7/2008 | Sugiyama |
| 9,235,066 B2 | 1/2016 | Ichikawa et al. |
| 2009/0290829 A1 * | 11/2009 | Kuratani ................. G02F 1/225 |
| | | 385/2 |
| 2014/0314364 A1 | 10/2014 | Huang |

OTHER PUBLICATIONS

Search Report dated Mar. 30, 2022, by Taiwan Patent Office in Application No. 110110094.

Huang et al. "Electro-Optic Ti:PPLN waveguide as efficient optical wavelength filter and polarization mode converter." Optics Express, vol. 15, No. 5, pp. 2548-2554 (Mar. 5, 2007).

\* cited by examiner

ELECTRO-OPTICAL INTENSITY MODULATION APPARATUS, CHIP AND SYSTEM

BACKGROUND

1. Technical Field

The present disclosure relates to an electro-optical intensity modulation apparatus, chip and system, and in particular an active extinction ratio controllable electro-optical intensity modulation apparatus, chip and system, wherein the electro-optical intensity modulation apparatus, chip and system use an electro-optical polarization rotation effect, a high-polarized selectivity optical waveguide and an integrated Mach-Zehnder interferometer to achieve integration and extinction ratio controllable purposes.

2. Related Art

The conventional Mach-Zehnder interferometer uses free space configuration to spread laser light, splits one beam of light into two beams through a beam splitter, and adjusts the relative propagation length of the two beams to create a phase difference between the two beams. Then, after the two modulated lights pass through the light combiner and are combined with each other, the combined light is interfered based on the principle of optical phase interference to achieve the purpose of light intensity modulation.

U.S. Pat. No. 4,709,978 provides an integrated Mach-Zehnder interferometer. This integrated Mach-Zehnder interferometer uses electro-optical crystal and optical waveguide channel technology to propagate the above-mentioned laser light in the light channel of the crystal rather than free space configuration. Then, through the use of a Y-type waveguiding beam splitter, one beam of light is divided into two beams. After that, by configuring the high-frequency coplanar waveguide electrodes, the relative phase of the two lights is adjusted by the electro-optic effect, and the two modulated lights are combined through a reverse Y-type waveguiding beam splitter, and then the combined light is interfered based on the principle of optical phase interference to achieved the function of electro-optical intensity modulation of the integrated Mach-Zehnder interferometer.

In the integrated Mach-Zehnder interferometer, two modulated lights will respectively pass through imperfect optical waveguides, and the way that the modulated light propagates in the optical waveguide is different from the way that the modulated light propagates in free space. Therefore, in optical waveguides, due to variations in manufacturing processes or environmental factors, two modulated lights may experience unexpected and different relative phase or intensity modulation changes, resulting in imperfect interference between the two modulated lights. In this way, the desired extinction ratio of the perfect destructive interference will not be as expected.

U.S. Pat. No. 6,334,005 B1 provides an integrated electro-optical intensity modulator with a controllable extinction ratio. This integrated electro-optical intensity modulator uses modulation voltages applied to the two optical waveguides of the Y-shaped branch to adjust the relative ratio of the light intensities of the two lights after the two lights pass through the Y-shaped branch, so as to achieve the purpose of adjusting the extinction ratio of brightness and darkness. Because this solution uses voltage to directly adjust the light intensity of the light at the entrance of the integrated Mach-Zehnder interferometer, it is necessary to arrange the electrode on the Y-branch optical waveguide. In practice, the possibility of mass production of this solution is greatly limited due to the following reasons: (1) the configuration of the electrode usually leads to an increase in optical loss, and the power splitting conditions usually vary with the quality of the electrode manufacturing process, so it is not easy to perform accurately compensation of optical loss; (2) since the Y-shaped branch waveguide is a key component for distributing optical energy, the configuration of the electrode here will increase the optical loss, resulting in the need to deal with the problem of additional optical loss, but this also causes mass production the instability to be increased significantly.

On the other hand, US published patent application US 2014/0314364 A1 provides a high extinction ratio electro-optical intensity modulator. After two lights pass through the light splitting of the Y-shaped branch optical waveguide, the two lights of the two optical waveguides are divided again by using the other two groups of Y-branched optical waveguides. Then, in conjunction with the electrode configuration, use the principle of interference to adjust the light intensity of each light. Then, after the triple light combining, the extinction ratio is regulated at the export. However, in practice, the practice of multiple splitting and multiple combining in the optical waveguide may not only cause a significant increase in optical loss, but also increase the variation of the light intensity ratio of each light splitting and combining, which actually increases technical difficulty for achieving the perfect splitting ratio (i.e. 50%:50%) of the high extinction ratio intensity modulator.

SUMMARY

An embodiment of the present disclosure provides an electro-optical intensity modulation apparatus comprising a non-linear optical substrate and electrodes. The non-linear optical substrate is provided with a first branch waveguide, a second branch waveguide, a first channel waveguide and a second channel waveguide thereon. The first channel waveguide and the second channel waveguide are disposed between the first branch waveguide and the second branch waveguide, and the first channel waveguide and the second channel waveguide are branched from the first branch waveguide and converged at the second branch waveguide. The electrodes are disposed on an area between the first branch waveguide and the second branch waveguide to make the first channel waveguide, the second channel waveguide and the electrodes form a radio frequency conversion push-pull electro-optic phase modulation unit, a push-pull electro-optic bias control unit, two sets of independent polarization rotation control units and a dual-channel relative light intensity ratio adjustment unit, which are sequentially connected.

According to the above features, the non-linear optical substrate is further provided with an entrance optical waveguide and an export optical waveguide, the entrance optical waveguide is connected to the first branch waveguide, and the export optical waveguide is connected to the second branch waveguide.

According to the above features, the first branch waveguide is a waveguide beam splitting unit, and a splitting ratio is 50%:50%.

According to the above features, the first branch waveguide is implemented by a diffused Y-shaped waveguide, a ridged Y-shaped waveguide, a diffused directional coupled waveguide structure, a ridged directional coupled waveguide structure, a diffused adiabatic coupled waveguide structure, or a ridged adiabatic coupled waveguide structure.

According to the above features, the second branch waveguide is a waveguide beam combining unit, and is implemented by a diffused converged Y-shaped waveguide, a ridged converged Y-shaped waveguide, a diffused directional coupled waveguide structure, a ridged directional coupled waveguide structure, a diffused adiabatic coupled waveguide structure, or a ridged adiabatic coupled waveguide structure.

According to the above features, the electrodes corresponding to the RF (Radio frequency) conversion push-pull electro-optic phase modulation unit are formed with a topology design of dual-parallel push-pull electrodes with low frequency modulation characteristics, a topology design of an asymmetric push-pull electrodes or a topology design of push-pull coplanar waveguide electrodes with high frequency modulation characteristics.

According to the above features, the electrodes corresponding to the push-pull electro-optic bias control unit are formed with a topology design of dual-parallel push-pull electrodes with low frequency modulation characteristics, a topology design of an asymmetric push-pull electrodes or a topology design of push-pull coplanar waveguide electrodes with high frequency modulation characteristics.

According to the above features, the electrodes corresponding to the two sets of the independent polarization rotation control units, the optical waveguide polarization filter unit and the dual-channel relative light intensity ratio adjustment unit formed with a topology design of dual-parallel push-pull electrodes with low frequency modulation characteristics, a topology design of an asymmetric push-pull electrodes or a topology design of push-pull coplanar waveguide electrodes with high frequency modulation characteristics.

According to the above features, the two sets of the independent polarization rotation control units are implemented by a nonlinear birefringent diffusion waveguide, a ridged waveguide with high polarization selectivity or an asymmetric polarization-selective channel waveguide.

According to the above features, the dual-channel relative light intensity ratio adjustment unit is formed by a polarization-depended differential loss waveguide, a polarization cut-off type waveguide or a high polarization extinction ratio waveguide.

According to the above features, each of the electrodes corresponding to the RF conversion push-pull electro-optic phase modulation unit has an electrode structure with three metal layers.

According to the above features, each of the electrodes corresponding to the push-pull electro-optic bias control unit has an electrode structure with two metal layers.

According to the above features, each of the electrodes corresponding to the two sets of the independent polarization rotation control units, the optical waveguide polarization filter unit and the dual-channel relative light intensity ratio adjustment unit has an electrode structure with two metal layers.

According to the above features, the optical waveguide polarization filter unit is implemented by an optical waveguide with a self-polarizer, wherein the optical waveguide with the self-polarizer is formed by a proton-exchange in a lithium niobate crystal.

According to the above features, the electrodes corresponding to the conversion push-pull electro-optic phase modulation unit and the non-linear optical substrate are provided with a RF area insulation layer therebetween, and the RF area insulation layer is used to adjust a RF equivalent refractive index.

According to the above features, the electrodes corresponding to the two sets of the independent polarization rotation control units, the optical waveguide polarization filter unit and the dual-channel relative light intensity ratio adjustment unit and the non-linear optical substrate are provided with a extinction ratio control area insulation layer therebetween, and the extinction ratio control area insulation layer is used to prevent electrode absorption loss.

An embodiment of the present disclosure provides an electro-optical intensity modulation chip formed by packaging one of the above electro-optical intensity modulation apparatuses.

An embodiment of the present disclosure provides an electro-optical intensity modulation system comprising an electro-optical intensity modulation chip formed by packaging one of the above electro-optical intensity modulation apparatuses, a light source providing unit, an electro-optical coupling unit, a RF signal source, a bias signal source and an extinction ratio control signal source. The light source providing unit provides a light source to be modulated to the electro-optical intensity modulation chip. The electro-optical coupling unit receives a modulated output light with a controllable extinction ratio output from the electro-optical intensity modulation chip. The RF signal source provides at least one electrical signal for modulating to the RF conversion push-pull electro-optic phase modulation unit. The bias signal source provides at least one biasing signal to the push-pull electro-optic bias control unit. The extinction ratio control signal source provides at least one control signal to the two sets of the independent polarization rotation control units.

According to the above features, the electro-optical coupling unit gives dynamical feedback to the extinction ratio control signal source and the bias signal source.

According to the above features, the light source providing unit and the RF signal source send the light source and the electrical signal synchronously.

The main purpose of the present disclosure is to provide an integrated electro-optical intensity modulation apparatus, chip and system that can actively adjust the extinction ratio by applying external voltages. Compared with the prior art solution, the extinction ratio of most integrated electro-optical intensity modulators is a fixed parameter, which cannot provide users for active adjustment. In addition, the voltage modulation section of the prior art solution is directly arranged at the branch of the Y-shaped waveguide, resulting in optical loss due to the electrode absorption effect. Due to the electrode configuration is arranged at the branch of the Y-shaped waveguide in the prior art, the opening of the branch is usually too small, making the electrode configuration and the manufacturing process more difficult, resulting in a significant decrease in the process yield due to such structure. Different from the prior art, in the present disclosure, a specially designed optical waveguide with high polarization selection characteristics is used, and the specially designed optical waveguide combined with an integrated electro-optical polarization rotator is integrated into the electro-optical intensity modulation chip. The electro-optical intensity modulation chip uses polarization-dependent loss characteristics and optical interference principles to achieve a set of an integrated electro-optical modulation apparatus, chip and system which extinction ratios are actively adjustable.

BRIEF DESCRIPTIONS OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTIONS OF EXEMPLARY EMBODIMENTS

Figure 1:
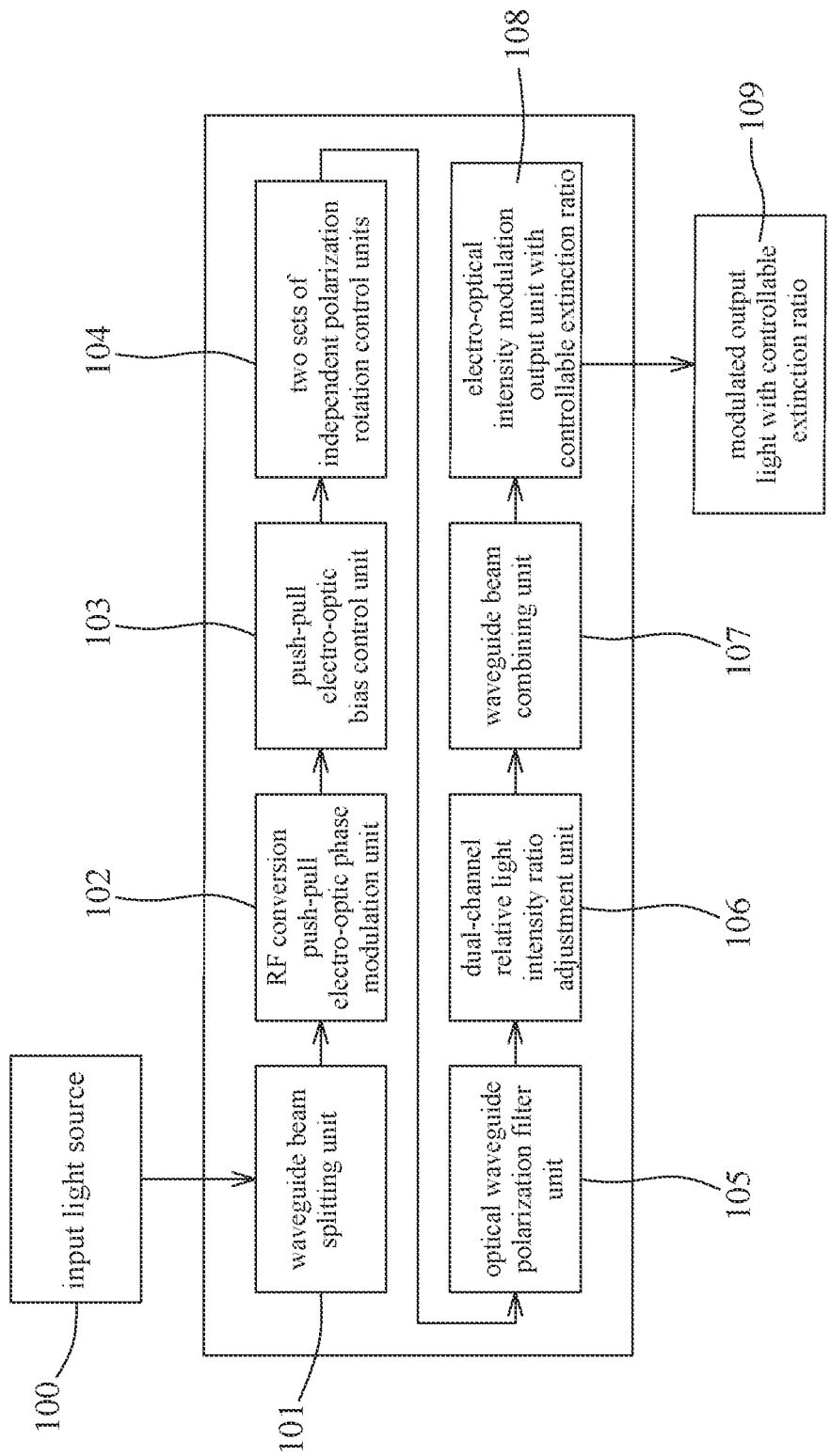
FIG. 1 is a function block diagram of an electro-optical intensity modulation apparatus with an extinction ratio being actively controllable according to an embodiment of the present disclosure.

To understand the technical features, content and advantages of the present disclosure and its efficacy, the present disclosure will be described in detail with reference to the accompanying drawings. The drawings are for illustrative and auxiliary purposes only and may not necessarily be the true scale and precise configuration of the present disclosure. Therefore, the scope of the present disclosure should not be limited to the scale and configuration of the attached drawings.

The electro-optical intensity modulation apparatus, chip and system with an active extinction ratio controllable function of embodiments of the present disclosure are mainly based on the integrated Mach-Zehnder interferometer to integrate an electro-optical polarization rotator and a high polarized waveguide. Specifically, the present disclosure uses electro-optical modulation technology to adjust the polarization ratios of the two optical waveguides behind the Y-branch, and cooperates with the optical waveguide with high polarization selectivity to perform polarization-dependent polarization filtering, so as to adjust the relative light intensity ratio of the two optical waveguides behind the Y-branch. The adjustment light intensity ratio is close to 50%:50%, in order to achieve the implementation of an active high extinction ratio controllable electro-optical intensity modulation apparatus, chip and system. In particular, the present disclosure achieves the feasibility of an active high extinction ratio controllable electro-optical intensity modulation apparatus realized by an integrated chip.

The basic operating principle of the electro-optical polarization rotator can be referred the U.S. Pat. No. 5,140,654. Therefore, the present disclosure will not describe the basic operating principle of the electro-optical polarization rotator in detail. The realization of the electro-optical polarization rotator is described as follows. Optical waveguides are manufactured on a substrate with electro-optical coefficients, the design of interdigitated electrodes which can be applied with voltages to the optical waveguides is performed on the substrate, and then, concepts of the electro-optical effect and the integrated electro-optic Solc-type filter are applied to achieve the function of a polarization rotator. An approach to achieve the function of a polarization rotator through the electro-optic effect and the integrated electro-optic Solc-type filter can refer to the published paper "Huang, C Y, et al., Electro-optic Ti: PPLN waveguide as efficient optical wavelength filter and polarization mode converter. *Optics express* 15.5 (2007): 2548-2554", and the present disclosure does not describe the redundant details again.

On the other hand, the principle of the high polarization selectivity optical waveguide can refer to U.S. Pat. No. 6,567,599 B2. Therefore, the present disclosure will not describe the principle of the high polarization selectivity optical waveguide in detail. The realization of the high polarization selectivity optical waveguide can use a diffuse ion doping method on an optical substrate with a controlled annealing mechanism to produce a low-loss optical waveguide channel on the surface of the optical substrate. For this type of diffusion ion doping method, hydrogen ions can be used as the diffusion source to fabricate optical waveguides on a wafer of non-linear material such as lithium niobate or lithium tantalate (such optical waveguides formed are usually called proton-exchange type optical waveguide). In addition, this type of optical waveguide has optical high polarization selectivity, which can increase the loss of one of the orthogonal polarizations, thereby achieving the function of polarization-dependent filtering.

Please note here that although the principles of electro-optical polarization rotator and high-polarization optical waveguide have been seen in the literature, there is currently no literature that informs that the twos can be directly integrated and modified to achieve an active extinction ratio controllable electro-optical intensity modulation apparatus, chip and system. Please note here that the electro-optical intensity modulation apparatus, chip and system with active extinction ratio controllable function in embodiments of the present disclosure are not a simple combination or easy modification of existing documents, and cannot be thought easily. The details will be described later in conjunction with the drawings.

First, refer to FIG. 1, and FIG. 1 is a function block diagram of an electro-optical intensity modulation apparatus with an extinction ratio being actively controllable according to an embodiment of the present disclosure. The functional blocks of the electro-optical intensity modulation apparatus with active extinction ratio controllable function in the embodiment of the present disclosure comprises a waveguide beam splitting unit 101, a RF (Radio frequency) conversion push-pull electro-optic phase modulation unit 102, a push-pull electro-optic bias control unit 103, two sets of independent polarization rotation control units 104, an optical waveguide polarization filter unit 105, a dual-channel relative light intensity ratio adjustment unit 106, a waveguide beam combining unit 107 and an electro-optical intensity modulation output unit 108 with the controllable extinction ratio, wherein all of them (i.e. components 101-108) are sequentially connected.

The light of the input light source 100 is received by the waveguide beam splitting unit 101, and the light will be divided into two beams. The waveguide beam splitting unit 101 can be is implemented by a diffused Y-shaped waveguide, a ridged Y-shaped waveguide, a diffused directional coupled waveguide structure, a ridged directional coupled waveguide structure, a diffused adiabatic coupled waveguide structure, or a ridged adiabatic coupled waveguide structure. A splitting ratio is dedicatedly designed to be 50%:50%. The RF conversion push-pull electro-optic phase modulation unit 102 is used to receive electrical signals for modulating, so as to perform electro-optic phase modulation on the two branched lights. The push-pull electro-optic bias control unit 103 adjusts and stabilizes the working position of the optical phase interference point of the two lights through biasing signals.

The two sets of independent polarization rotation control units 104 receive an adjustable control signal to control the polarization rotation of the light in the optical channel. The optical waveguide polarization filter unit 105 has a polarization filtering effect, which only allows the light in a specific polarization direction to pass. Furthermore, the refractive index of the specific polarization axis of the optical waveguide polarization filter unit 105 is high, which can allow light polarized in a specific direction to pass, but for light orthogonal to the specific polarization direction, it will not pass, so it has a high polarization filter effect (i.e. high polarization selectivity). The dual-channel relative light intensity ratio adjustment unit 106 receives the control signal to adjust the relative light intensity ratio of the filtered lights in the two channels of the optical waveguide polarization filter unit 105.

Specifically, the two sets of the independent polarization rotation control units 104 can be two sets of optical polarization filter units implemented by nonlinear birefringent diffused waveguides, high polarization selectivity ridged waveguides or asymmetric polarization selective channel waveguides. In addition, the dual-channel relative light intensity ratio adjustment unit 106 can be made of a polarization-depended differential loss waveguide, a polarization cut-off type waveguide, or a high polarization extinction ratio waveguide.

Specifically, the implementation of the optical waveguide polarization filter unit 105 is described as follows. On the lithium niobate substrate of birefringent nonlinear optical material, the local refractive index at the optical channel on the crystal surface is changed by using proton-exchange. Because this solution uses protons (such as, hydrogen ions, $H^+$) to exchange lithium ions ($Li^+$) in lithium niobate crystals, and the lithium ions have specific arrangements and positions in the lithium niobate crystals, so the optical waveguide made by proton-exchange only increases the refractive index of a single polarization axis. In this way, the waveguide is a single-direction polarized light guide, and at the same time, the polarized light in another orthogonal direction cannot be guided, and a high polarization selectivity optical waveguide is formed. Through the above method, the objective of forming an optical waveguide polarization filter unit 105 in the waveguide can be achieved, so as to realize the function of the waveguide with a high self-polarizer.

Further, the solution of proton-exchange in lithium niobate crystals to achieve the implementation of optical waveguides with the self-polarizers can be merely proton-exchanged (PE), annealed proton-exchanged (APE), soft proton-exchanged (SPE), high-temperature proton-exchanged (HTPE), reversed proton-exchanged (RPE) and other solution. Through any of the above solutions, a single-direction polarized light guide optical filter waveguide can be fabricated, and the details of the proton switching process method can refer to the solution provided by U.S. Pat. No. 6,567,599 B2. The proton-exchange nonlinear optical waveguide used in the embodiment of the present disclosure can transmit light to the channel of the optical waveguide in the chip, and use self-polarization filter mechanism of the waveguide to form the self-polarization filter of the waveguide to implement the optical waveguide polarization filter unit 105 without manufacturing a special waveguide structure.

Next, the waveguide beam combining unit 107 combines the two lights into one light. The waveguide beam combining unit 107 is implemented by a diffused converged Y-shaped waveguide, a ridged converged Y-shaped waveguide, a diffused directional coupled waveguide structure, a ridged directional coupled waveguide structure, a diffused adiabatic coupled waveguide structure, or a ridged adiabatic coupled waveguide structure. The objective of the waveguide beam combining unit 107 is to combine the two lights in the two channels of the two waveguides. Finally, optical destructive interference is performed through the electro-optical intensity modulation output unit 108 with the controllable extinction ratio to achieve the purpose of outputting the modulated output light 109 with the controllable extinction ratio. Simply put, the configuration of two sets of the independent polarization rotation control units 104, the optical waveguide polarization filter unit 105 and the dual-channel relative light intensity ratio adjustment unit 106 realizes the high-efficiency active extinction ratio controllable function of the electro-optical intensity modulation apparatus.

Figure 2:
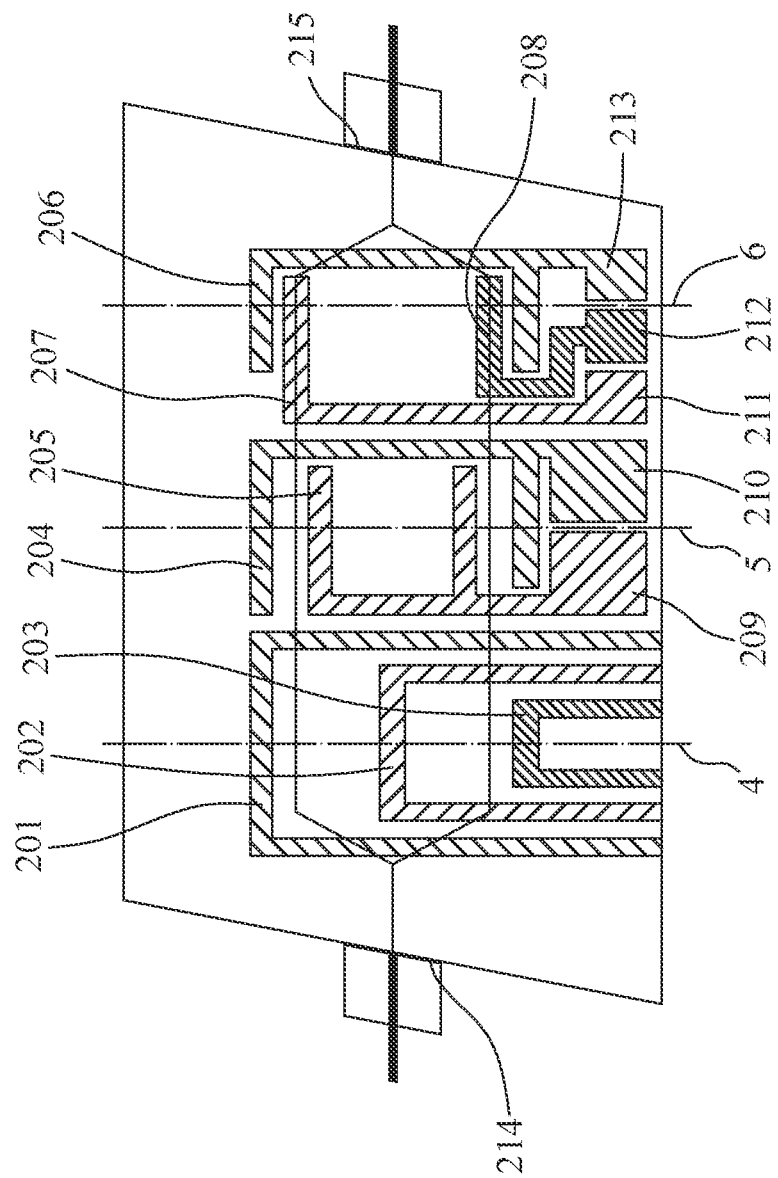
FIG. 2 is a structural diagram of an electro-optical intensity modulation chip with an extinction ratio being actively controllable according to an embodiment of the present disclosure.

Refer to FIG. 1 and FIG. 2, and FIG. 2 is a structural diagram of an electro-optical intensity modulation chip with an extinction ratio being actively controllable according to an embodiment of the present disclosure. Through the integration technology, the electro-optical intensity modulation apparatus in FIG. 1 can be realized with an electro-optical intensity modulation chip. The electro-optical intensity modulation chip is realized by a packaged and integrated non-linear optical substrate, wherein the non-linear optical substrate is formed with a plurality of optical waveguides and a plurality of electrodes 201-208 are arranged thereon. The non-linear optical substrate has a first fiber connection port 214 and a second fiber connection port 215, which serve as the entrance and export of the two optical channels. In FIG. 2, the left and right Y-shaped branches are respectively used as the waveguide beam splitting unit 101 and the waveguide beam combining unit 107.

Figure 4:
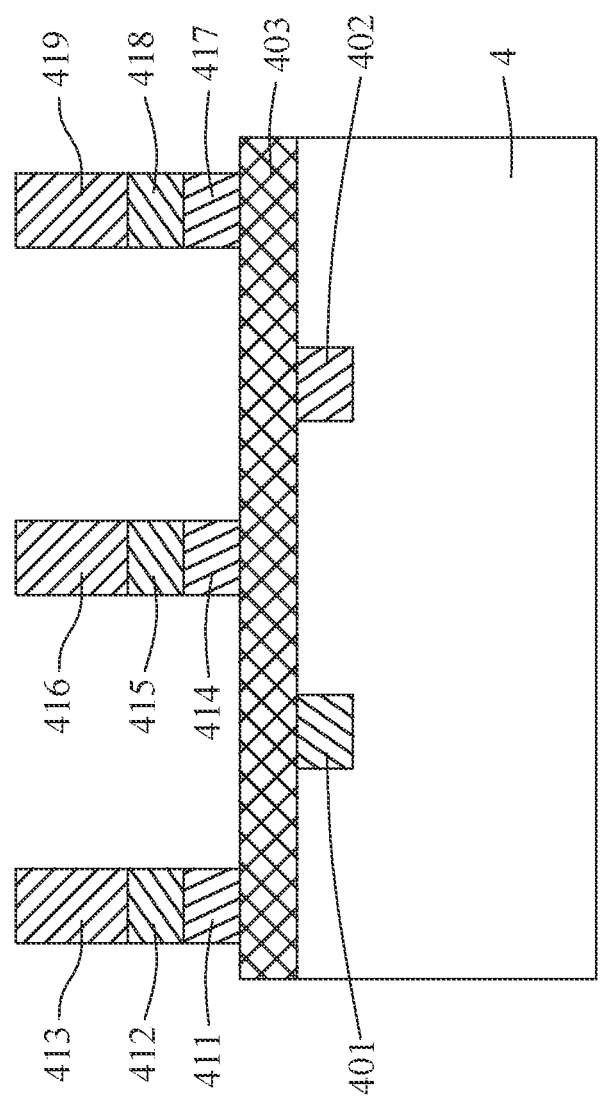
FIG. 4 is a structural diagram of sections of coplanar RF electrodes of an electro-optical intensity modulation chip with an extinction ratio being actively controllable according to an embodiment of the present disclosure.

The electrodes 201 to 203 are used as the first to third RF modulation electrodes to form the RF conversion push-pull electro-optic phase modulation unit 102, wherein the optical waveguide and the electrodes corresponding to the RF conversion push-pull electro-optic phase modulation unit 102 are configured as the section 4 of the RF modulation area, and the details of the section 4 can be shown in FIG. 4, which will not be repeated here. The electrodes 201 to 203 are in the shape of "U", the electrode 201 surrounds the electrode 202, and the electrode 202 surrounds the electrode 203. The horizontal part of electrode 201 is close to the optical channel of the upper optical waveguide of the non-linear optical substrate, the horizontal part of electrode 202 is located between the optical channel of the upper optical waveguide and the optical channel of the lower optical waveguide of the non-linear optical substrate, and the electrode 203 is close to the lower optical waveguide of the non-linear optical substrate. Through this configuration, the electrodes 201-203 can receive three different electrical signals for modulating to precisely modulate the relative light phases in the two optical channels.

Specifically, the electrodes 201-203 for implementing the RF conversion push-pull electro-optic phase modulation unit 102 are formed with a topology design of dual-parallel push-pull electrodes with low frequency modulation characteristics, a topology design of an asymmetric push-pull electrodes or a topology design of push-pull coplanar waveguide electrodes with high frequency modulation characteristics. The RF conversion push-pull electro-optic phase modulation unit 102 can use the RF signal source and RF amplifier to adjust the RF frequency and intensity of the electrical signal for modulating, and cooperate with the electro-optic effect characteristics of nonlinear materials to achieve the function of converting RF energy to the optical band.

The electrodes 204 and 205 are used as first and second bias modulation electrodes, respectively. The electrode 204 is an interdigitated electrode, which has two horizontal parts close to the upper and lower optical channels of the non-linear optical substrate, and it has an electrode input port 209 for bias modulation to receive one of the biasing signals, and the electrode 205 is an interdigitated electrode, which has two horizontal parts close to the optical channels of the upper and lower optical waveguide of the non-linear optical substrate, and it has an electrode input port 210 for bias modulation to receive another biasing signal. The configuration of electrodes 204 and 205 can be used to realize push-pull electro-optic bias control unit 103, wherein the configuration of the optical waveguides and electrodes corresponding to push-pull electro-optic bias control unit 103 is shown as a section 5 of the bias modulation area, and details of the section 5 are omitted herein, but can be shown in FIG. 5.

Specifically, the electrodes 204 and 205 for implementing the push-pull electro-optic bias control unit 103 are formed with a topology design of dual-parallel push-pull electrodes with low frequency modulation characteristics, a topology design of an asymmetric push-pull electrodes or a topology design of push-pull coplanar waveguide electrodes with high frequency modulation characteristics. The push-pull electro-optic bias control unit 103 can adjust and stabilize the working position of the optical phase interference point through the biasing signals applied to the electrodes 204 and 205.

The electrodes 206 to 208 are respectively used as the first to third extinction ratio control electrodes. The electrode 207 has a horizontal part directly on the optical channel of the upper optical waveguide on the non-linear optical substrate, and has an electrode input port 211 for extinction ratio control to receive one of the control signals for extinction ratio control. The electrode 208 has a horizontal part directly on the optical channel of the lower optical waveguide under the non-linear optical substrate, and has an electrode input port 212 for extinction ratio control to receive another control signal for extinction ratio control. The electrode 206 is an interdigitated electrode, which has two horizontal parts close to the optical channels of the upper and lower optical waveguides of the non-linear optical substrate respectively, and has an electrode input port 213 for extinction ratio control to receive the other one control signal for extinction ratio control.

The difference in the electric field intensities generated by the configuration of the electrodes 206-208 and the control signals applied to the electrodes 206-208 can be used to realize the two sets of the independent polarization rotation control units 104. The configuration of the electrode input ports 211-213 that control the extinction ratio and the differences of the voltages of the control signals applied to the electrode input ports 211-213 can realize the dual-channel relative light intensity ratio adjustment unit 106. The optical waveguide and electrode configuration corresponding to the implementation of the two sets of the independent polarization rotation control units 104 and the dual-channel relative light intensity ratio adjustment unit 106 can be shown by the section 6 of the extinction ratio control area. For details of the section 6, please refer to FIG. 6, and the details are omitted herein.

By adjusting the difference in electric field intensities generated by the control signals applied on the electrodes 206-208, the polarization rotations of the two sets of the independent polarization rotation control units 104 to the lights of the channels of the two optical waveguides can be adjusted. By adjusting relative voltage differences of the control signals applied to the electrode input ports 211-213, and by using the self-polarization filtering of the optical waveguide (i.e. the optical waveguide polarization filter unit 105, the function of the dual-channel relative light intensity ratio adjustment unit 106 can be achieved.

Specifically, the electrodes 206-208 for implementing the two sets of independent polarization rotation control units 104 are formed with a topology design of dual-parallel push-pull electrodes with low frequency modulation characteristics, a topology design of an asymmetric push-pull electrodes or a topology design of push-pull coplanar waveguide electrodes with high frequency modulation characteristics. In conjunction with the electro-optic effect of the nonlinear crystal, the independently controlled electrodes 206-208 are used to modulate the relative electric field intensities with different voltages, so that the polarization rotation can be adjusted independently in the two optical channels of the optical waveguide.

Figure 3:
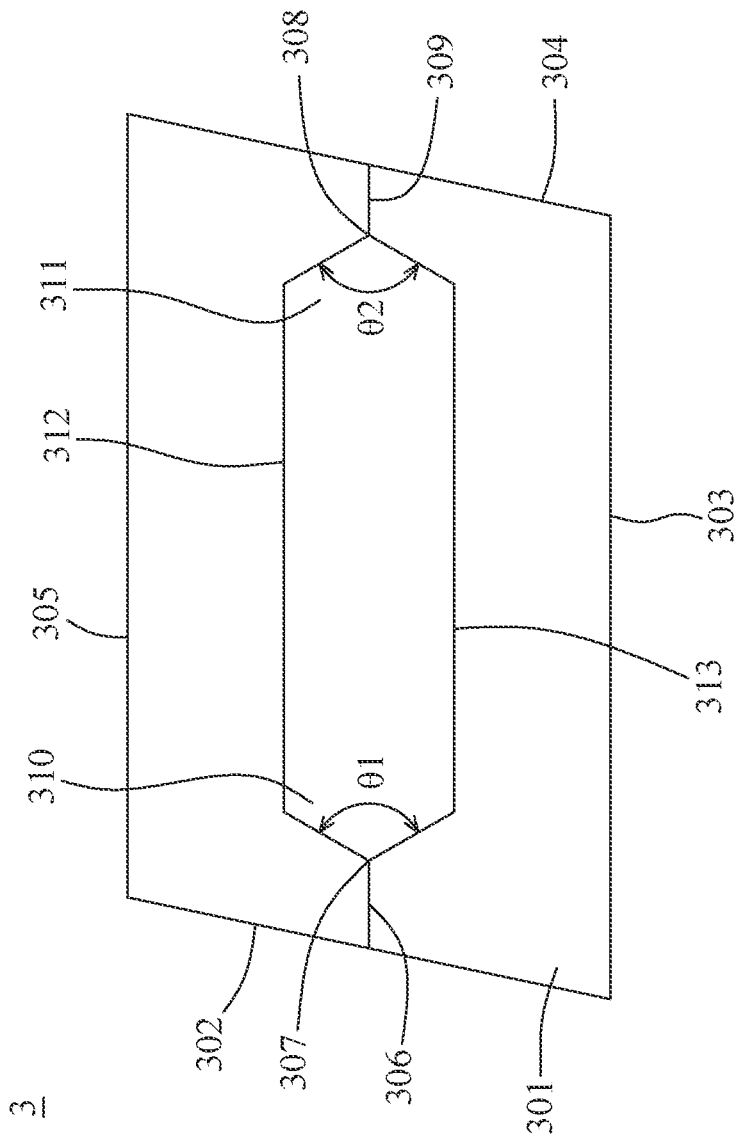
FIG. 3 is a structural diagram of a highly selective waveguide polarizer and optical waveguides of an electro-optical intensity modulation chip with an extinction ratio being actively controllable according to an embodiment of the present disclosure.

Refer to FIG. 3, and FIG. 3 is a structural diagram of a highly selective waveguide polarizer (i.e. optical waveguide polarization filter unit 105) and optical waveguides of an electro-optical intensity modulation chip with an extinction ratio being actively controllable according to an embodiment of the present disclosure. The shape of the electro-optical intensity modulation chip 3 is a quadrilateral, such as a parallelogram or a rectangle. Preferably, as in the embodiment of FIG. 3, the shape of the electro-optical intensity modulation chip 3 is a parallelogram, and the non-linear optical substrate 301 has a first side 302, a second side 303, a third side 304 and a fourth side 305, which are connected in sequence in a counterclockwise direction. The first side 302 and the third side 304 correspond to each other and are arranged in parallel, the second side 303 and the fourth side 305 correspond to each other and are arranged in parallel, the two ends of the first side 302 are respectively connected to the second side 303 and the fourth side 305, and the two ends of the third side 304 are connected to the second side 303 and the fourth side 305 respectively.

The entrance optical waveguide 306 is used for fiber connection, and the first branch waveguide 307 performs light intensity splitting. The angle value of the first branch angle in the direction of the right side opening 310 of the first branch waveguide 307 is θ1. Through the light splitting of the first branch waveguide 307, the aforementioned waveguide beam splitting unit 101 can be achieved. The first branch waveguide 307 to the right will be divided into two optical channels of a first channel waveguide 312 and a second channel waveguide 313. The electrodes 201-208 are arranged in the segment of the first channel waveguide 312 and the second channel waveguide 313 to realize functions of the RF conversion push-pull electro-optic phase modulation unit 102, the push-pull electro-optic bias control unit 103, the two sets of the independent polarization rotation control units 104, the optical waveguide polarization filter unit 105 and the dual-channel relative light intensity ratio adjustment unit 106. The electrode input ports 209 to 213 are arranged on the side section of the non-linear optical substrate 301. The angle value of the second branch angle in the direction of the left side opening 311 which the first channel waveguide 312 and the second channel waveguide 313 pass through is θ2. The waveguide light combining is performed by the second branch waveguide 308 (used to realize the aforementioned waveguide beam combining unit 107), and then the export optical waveguide 309 is used for fiber connection.

Refer to FIG. 4, and FIG. 4 is a structural diagram of sections of coplanar RF electrodes of an electro-optical intensity modulation chip with an extinction ratio being actively controllable according to an embodiment of the present disclosure. Details of the section 4 in FIG. 2 are shown in FIG. 4. The section 4 of the radio frequency modulation area comprises a section 401 of the first channel waveguide 312, a section 402 of the second channel waveguide 313, an RF area insulation layer 403 for adjusting the radio frequency equivalent refractive index and multiple metal layers 411-419. The section of the electrode 201 includes metal layers 411-413 as the first to third layers of the first radio frequency modulation electrode, that is, the electrode 201 has a three-layer metal structure. The section of the electrode 202 includes the metal layers 414-416 as the first to third layers of the second radio frequency modulation electrode, that is, the electrode 202 has a three-layer metal structure. The section of the electrode 203 includes metal layers 417-419 as the first to third layers of the third radio frequency modulation electrode, that is, the electrode 203 has a three-layer metal structure.

The electrode 201 is arranged on the upper left side of section 401, electrode 202 is arranged on the upper right side of section 401 and on the upper left side of section 402, and electrode 203 is arranged on the upper left side of section 402. The distance between electrodes 201 and 202 is the same as that between electrodes 202 and 203, or the distance between electrodes 201 and 202 is different from that between electrodes 202 and 203. By adjusting the relative electric field intensities of electrodes 201-203 corresponding to sections 401 and 402 and by using the electro-optic effect of the crystals, the function of the RF conversion push-pull electro-optic phase modulation unit 102 can be achieved.

The solution described in FIG. 4 is a solution that utilizes at least three metal layer configurations to achieve coplanar RF electrodes. The three metal layers are divided into a bonding layer, a thin film layer and a thick film layer. Since the non-linear material and the metal layer need to use the bonding layer to improve the resistance of the electrode tension, the thickness of the bonding layer is about 1-30 nm. The metal layers 411, 414 and 417 of the first layer are all metal bonding layer profiles, and the metal layers 412, 415 and 418 of the second layer are the thin film layer. The thin film layer is the conductive seed layer of the subsequent thick film layer manufacturing process. The thickness of the thin film layer is about 50-500 nm, and it is set under the thick film layer for thick film layer production. The metal layers 413, 416 and 419 of the third layer are the thick film layer, of which the required thickness of the thick film layer is about 1000-50000 nm, and the thick film layer is a key control factor for realizing high-frequency and wide-band RF electrodes.

The above-mentioned bonding layer material can be: transition metals in the first transition metal group, such as vanadium, titanium, nickel, copper, cobalt, chromium, etc., and this layer can be completed by conventional common evaporation or sputtering equipment. The material of the above-mentioned thin film layer can be: common high conductivity metal, such as silver, copper, annealed copper, gold, aluminum, or transparent conductive film, such as indium tin oxide (ITO), etc., and this layer can completed by using conventional common evaporation or sputtering equipment. The above-mentioned thick film layer material can be: common high conductivity metal, such as copper, annealed copper, gold, aluminum, etc., and this layer can be completed by using conventional common electroplating or chemical coating equipment.

Under this concept, a single metal material can also be used to simultaneously achieve a bonding layer, a thin film layer, and a thick film layer, such as high-thickness metals in the first transition metal group (vanadium, titanium, nickel, chromium and other metals). Although this single-layer structure can be completed by conventional common vapor deposition or sputtering equipment, the usage of the vapor deposition or sputtering equipment for achieving the above-mentioned thickness is expected that the process cost, material cost and time cost will be greatly increased.

Figure 5:
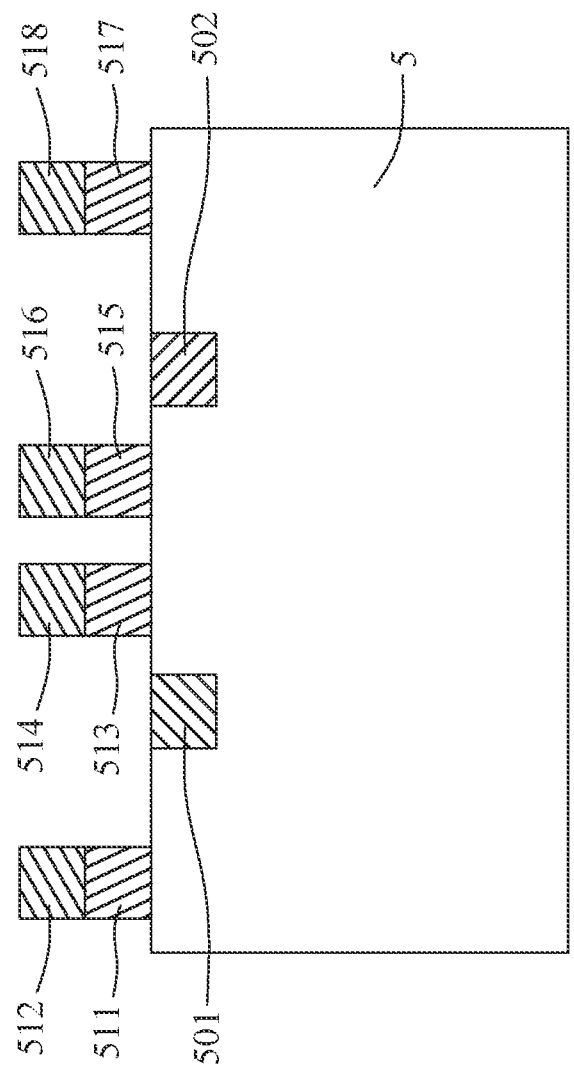
FIG. 5 is a structural diagram of sections of biasing control electrodes of an electro-optical intensity modulation chip with an extinction ratio being actively controllable according to an embodiment of the present disclosure.

Refer to FIG. 5, and the details of the section 5 in FIG. 2 are shown in FIG. 5. The section 5 includes a section 501 of the first channel waveguide 312, a section 502 of the second channel waveguide 313, and multiple metal layers 511-518. The section of the electrode 204 includes metal layers 511 and 512 located at the upper left of section 501 of the first channel waveguide and used as the first bias modulation electrode, and further includes metal layers 517 and 518 located at the upper right of section 502 of the second channel waveguide and used as the first bias modulation electrode. That is, the electrode 204 used as the first bias modulation electrode has a two-layer metal structure. The metal layers 511, 512, 517 and 518 are conductive to each other. The section of electrode 205 includes metal layers 513 and 514 located at the upper right of section 501 of the first channel waveguide and used as the second bias modulation electrode, and further includes metal layers 515 and 516 located at the upper left of section 502 of the second channel waveguide and used as the second bias modulation electrode. That is, the electrode 205 used as the second bias modulation electrode has a two-layer metal structure. The metal layers 513-516 are conductive to each other.

The distance between the metal layers 511, 512 and the metal layers 513, 514 may be equal to the distance between the metal layers 515, 516 and the metal layers 517, 518, but the present disclosure is not limited thereto. The distance between the metal layers 513, 514 and the metal layers 515, 516 may be equal to or smaller than the distance between the sections 501 and 502. By using electrode input ports 209 and 210 to adjust the relative electric field intensities of the electrodes 204, 205 in respective to the sections 501, 502, and by using the electro-optic effect of the crystal, the function of push-pull electro-optic bias control unit 103 can be achieved.

The solution described in FIG. 5 is a solution that utilizes at least two metal layer configurations to achieve a bias control electrode. The two metal layers are divided into a bonding layer and a thin film layer. Since the non-linear material and metal layer need to use the bonding layer to improve the resistance of the electrode tension, the thickness of the bonding layer is about 1-30 nm. The metal layers 511, 513, 515, and 517 of the first layer are the metal bonding layer, and the metal layers 512, 514, 516, and 518 of the second layer are the thin film layer. The thickness of the thin film layer is about 50-3000 nm to meet the requirements of the subsequent metal bonding and packaging process. In the implementation process, it is necessary to control the relative position of the thin film layer of the electrode and the surrounding waveguide to realize the key factor control of the bias control.

The above-mentioned bonding layer material can be: transition metals in the first transition metal group, such as vanadium, titanium, nickel, copper, cobalt, chromium, etc., and this layer can be completed by conventional common evaporation or sputtering equipment. The material of the above-mentioned thin film layer can be: common high conductivity metal, such as silver, copper, annealed copper, gold, aluminum, or transparent conductive film, such as indium tin oxide (ITO), etc., and this layer can completed by using conventional common evaporation or sputtering equipment.

Under this concept, a single metal material can also be used to simultaneously achieve a bonding layer, a thin film layer, and a thick film layer, such as high-thickness metals in the first transition metal group (vanadium, titanium, nickel, chromium and other metals). Although this single-layer structure can be completed by conventional common vapor deposition or sputtering equipment, the usage of the vapor deposition or sputtering equipment for achieving the above-mentioned thickness is expected that the process cost, material cost and time cost will be greatly increased.

Figure 6:
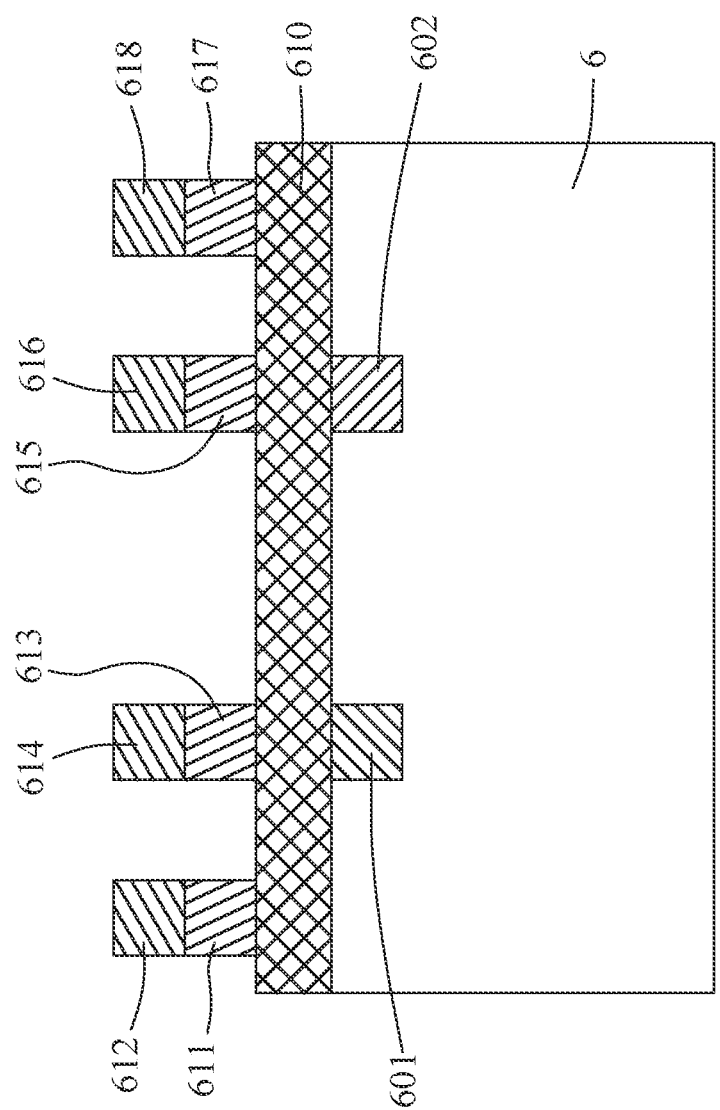
FIG. 6 is a structural diagram of sections of polarization rotation and polarization filter electrodes of an electro-optical intensity modulation chip with an extinction ratio being actively controllable according to an embodiment of the present disclosure.

Refer to FIG. 6, and details of the section 6 in FIG. 2 are shown in FIG. 6. The section 6 includes a section 601 of the first channel waveguide 312 in the extinction ratio control area, a section 602 of the second channel waveguide 313 in the extinction ratio control area, an extinction ratio control area insulation layer 610 for preventing electrode absorption loss (that is, as an optical insulating layer) and a plurality of metal layers 611-618. The section of the electrode 206 includes the metal layers 611 and 612 located at the upper left of section 601 of the first channel waveguide 312 and used as the first extinction ratio rate control electrode, and further includes the metal layers 617 and 618 at the upper right of section 602 of the second channel waveguide 313 and used as the first extinction ratio rate control electrode. That is, the electrode 206 used as the first extinction ratio control electrode has a two-layer metal structure. The metal layers 611, 612, 617, and 618 are conductive to each other. The section of the electrode 207 includes the metal layers 613 and 614 located directly on the section 601 of the first channel waveguide 312 and used as the second extinction ratio control electrode. That is, the electrode 207 used as the second extinction ratio rate control electrode has a two-layer metal structure. The section of electrode 208 includes the metal layers 615 and 616 located directly on the section 602 of the second channel waveguide 313 and used as the third extinction ratio rate control electrode. That is, the electrode 208 used as the third extinction ratio control electrode has a two-layer metal structure.

The voltage of the control signal of the electrode 206 as the first extinction ratio control electrode is controlled by the electrode input port 213, the voltage of the control signal of the electrode 207 as the second extinction ratio rate control electrode is controlled by the electrode input port 211, and the voltage of the control signal of the electrode 208 as the third extinction ratio control electrode is controlled by the electrode input port 212. By using the electrode input ports 211-213 to adjust the relative electric field intensity at the sections 601 and 602 of the electrodes 206-208, and by using the electro-optic effect of the crystal, the function of the two sets of the independent polarization rotation control units 104 can be achieved; and by using the self-polarization selective filtering mechanism of the optical waveguide, the function of the optical waveguide polarization filter unit 105 can be achieved. Furthermore, by adjusting the relative voltage proportions of the three control signals of the electrode input ports 211-213, in conjunction with the two sets of the independent polarization rotation control units 104 and the optical waveguide polarization filter unit 105, the function of dual-channel relative light intensity ratio adjustment unit 106 can be achieved.

The solution described in FIG. 6 utilizes at least two metal layer configurations to achieve a schematic structural solution with polarization rotation and polarization filtering electrodes. The two metal layers are divided into a bonding layer and thin film layer. Since the non-linear material and the metal layer need to use a bonding layer to improve the resistance of the electrode tension, the thickness of the bonding layer is about 1-30 nm. The metal layers 611, 613, 615, and 617 are the metal bonding layer, and the metal layers 612, 614, 616, and 618 are the thin film layer. The thickness of the thin film layer is about 500-5000 nm to meet the requirements of the subsequent metal wire bonding and packaging process. In the implementation process, it is necessary to control the relative position configuration the thin film layer of the electrode and the surrounding waveguide to realize the key factor control of the polarization rotation and polarization filtering electrode.

The above-mentioned bonding layer material can be: transition metals in the first transition metal group, such as vanadium, titanium, nickel, copper, cobalt, chromium, etc., and this layer can be completed by conventional common evaporation or sputtering equipment. The material of the above-mentioned thin film layer can be: common high conductivity metal, such as silver, copper, annealed copper, gold, aluminum, or transparent conductive film, such as indium tin oxide (ITO), etc., and this layer can completed by using conventional common evaporation or sputtering equipment.

Under this concept, a single metal material can also be used to simultaneously achieve a bonding layer, a thin film layer, and a thick film layer, such as high-thickness metals in the first transition metal group (vanadium, titanium, nickel, chromium and other metals). Although this single-layer structure can be completed by conventional common vapor deposition or sputtering equipment, the usage of the vapor deposition or sputtering equipment for achieving the above-mentioned thickness is expected that the process cost, material cost and time cost will be greatly increased.

Figure 7:
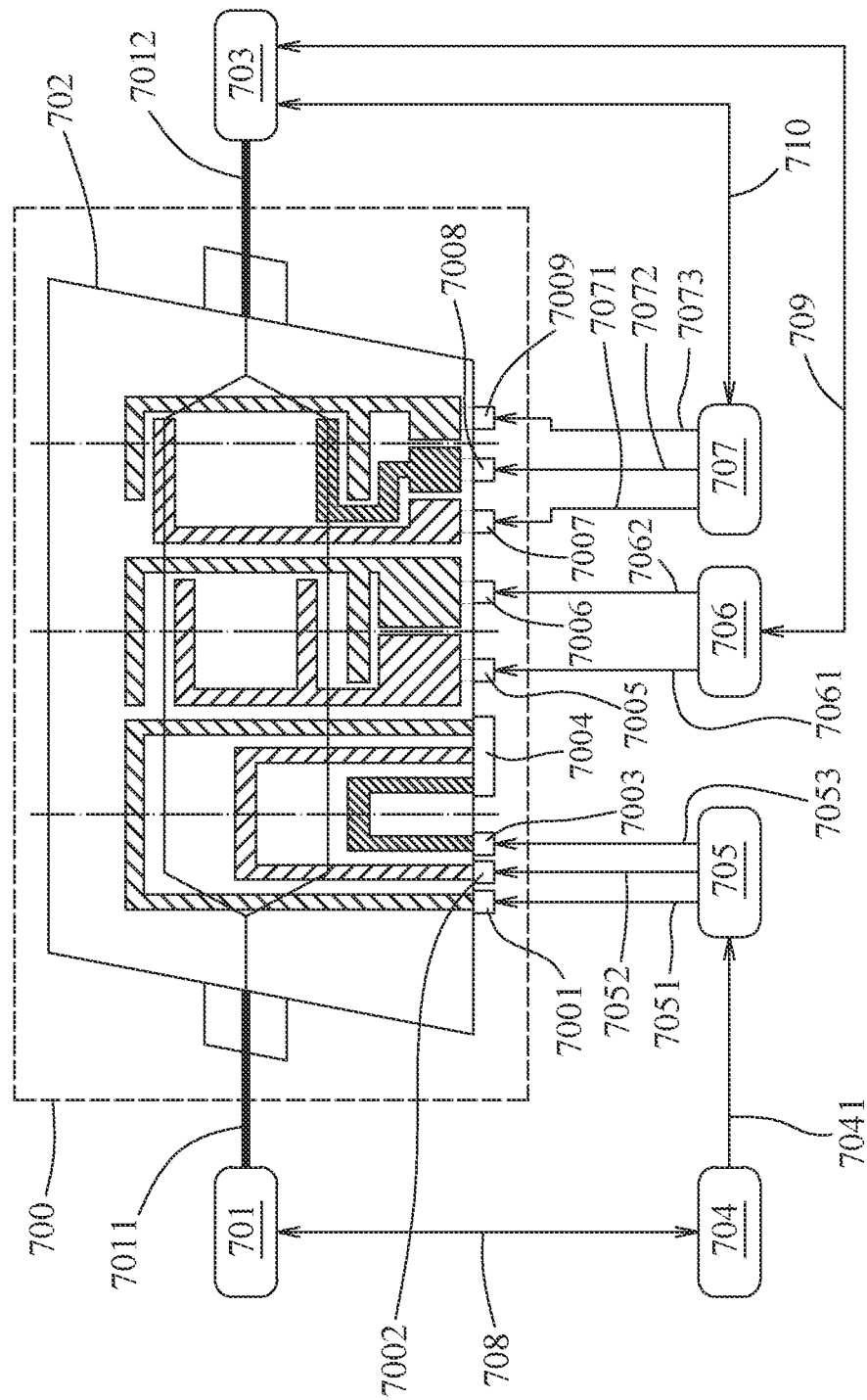
FIG. 7 is a configuration diagram showing an electro-optical intensity modulation system with an extinction ratio being actively controllable according to an embodiment of the present disclosure.

Please refer to FIG. 7. After connecting the electro-optical intensity modulation chip 702 of the embodiment of the present disclosure to the entrance light guide fiber 7011 and the export light guide fiber 7012, an electro-optical intensity modulation system 700 can be formed. The light source providing unit 701 can be a continuous laser light source, pulsed laser light source, amplified spontaneous emission (ASE) light source, super luminescent diode (SLED) light source and other broadband light source, heralded single photon source (HSPS), or quantum entangled photon pairs. Through the entrance light guide fiber 7011, the light source providing unit 701 can emit the light source to be modulated to the electro-optical intensity modulation chip 702; and through the export light guide fiber 7012, the modulated light signal can be emitted to the electro-optical coupling unit 703 at the application side. The electro-optical coupling unit 703 can be a light intensity detector, a spectrum analyzer, an optical mode detector, or a single photon detector, and the present disclosure is not limited thereto.

The RF signal source 704 allows the user to transfer the RF signal from the RF signal connection wire 7041 to the RF amplifier 705. The RF amplifier 705 is used to generate the amplified RF signal as the aforementioned electrical signal for modulating. The electrical signals for modulating are imported into the RF modulation electrode ports 7001-7003 through the connection wires 7051-7053, and then the electrical signals for modulating are imported into the electrodes 201-203 (i.e. the first to third RF modulation electrodes) in the RF modulation area of the electro-optical intensity modulation chip 702 through the RF modulation electrode ports 7001-7003. The RF signal source 704 and the light source providing unit 701 send the electrical signals and the light source synchronously via the synchronous connection loop 708. On the other hand, in the electro-optical intensity modulation chip 702, the electrodes 201-203 used as the first to third RF modulation electrodes need to connect at least one terminal resistor 7004 to achieve a coplanar waveguide for traveling wave modulation. The RF conversion push-pull electro-optic phase modulation unit 102 achieves the RF modulation result, thereby increasing the high frequency response bandwidth of the electro-optical intensity modulation chip 702 at the RF frequency.

Furthermore, in the bias modulation area, the bias signal source 706 are respectively connected to electrode input ports 209, 210 of the first and second bias modulation electrodes via the connection wires 7061, 7062 and the bias ports 7005, 7006 of the electro-optical intensity modulation chip 702. In this way, the bias control can be performed through the push-pull electro-optic bias control unit 103, and the electro-optical coupling unit 703 on the application side gives the dynamic feedback to the bias signal source 706 via the feedback signal connection loop 709.

Next, the extinction ratio control signal source 707 can transmit the control signals to the signal ports 7007-7009 of the electro-optical intensity modulation chip 702 through the connection wires 7071 to 7073. By transmitting the control signals to the electrode input ports 211-213 as the extinction ratio control electrodes, the extinction ratio control signal source 707 can adjust the relative electric field intensities of the electrodes 206-208 to form the two sets of the independent polarization rotation control units 104. In addition, in conjunction with the polarization filtering characteristics of the optical waveguide, in particular, the extinction ratio control signal source 707 can utilize the feedback signal connection loop 710 and the electro-optical coupling unit 703 on the application side for dynamic feedback to achieve active control of the extinction ratio of high frequency electro-optical intensity modulation.

From the above description, compared with the prior art, the electro-optical intensity modulation apparatus, chip and system provided by the present disclosure adjust the optical polarization of the two waveguides separately, and cooperate with the optical waveguide with self-polarization, the use of external voltages can easily achieve the purposes of active electro-optical intensity modulation and controllable extinction ratio. Since the present disclosure arranges the electrodes at the two optical waveguides, that the integrated Mach-Zehnder interferometer chip in the prior art need to arrange the electrodes at the Y-shaped branch waveguides can be avoided. In addition to avoiding the optical loss caused by excess electrode absorption, the present disclosure also avoids the decrease in the overall chip yield. The overall chip yield decline is due to the prior art solution requiring the electrode configuration at the Y-shaped branch waveguide. As a result, the relative position configuration of the electrode and the waveguide needs to be precise and the process tolerance is low. With the solution of the present disclosure, if the electrodes are configured in the dual waveguide area, and the design of the protective layer between the waveguide and the electrode layer is correspondingly designed, there is no need to fabricate the electrodes in the interval of the Y-shaped branch waveguide. Then, by using the separately adjustable voltages and the feedback mechanism of the external circuit, it can not only increase the predictable chip yield, but also improve the user's actual application convenience on the system.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An electro-optical intensity modulation apparatus, comprising:
   a non-linear optical substrate, provided with a first branch waveguide, a second branch waveguide, a first channel waveguide and a second channel waveguide thereon, wherein the first channel waveguide and the second channel waveguide are disposed between the first branch waveguide and the second branch waveguide, and the first channel waveguide and the second channel waveguide are branched from the first branch waveguide and converged at the second branch waveguide; and
   a plurality of electrodes, disposed on an area between the first branch waveguide and the second branch waveguide, so as to make the first channel waveguide, the second channel waveguide and the electrodes form a radio frequency (RF) conversion push-pull electro-optic phase modulation unit, a push-pull electro-optic bias control unit, two sets of independent polarization rotation control units and a dual-channel relative light intensity ratio adjustment unit, which are sequentially connected.

2. The electro-optical intensity modulation apparatus of claim 1, wherein the non-linear optical substrate is further provided with an entrance optical waveguide and an export optical waveguide, the entrance optical waveguide is connected to the first branch waveguide, and the export optical waveguide is connected to the second branch waveguide.

3. The electro-optical intensity modulation apparatus of claim 1, wherein the first branch waveguide is a waveguide beam splitting unit, and a splitting ratio is 50%:50%.

4. The electro-optical intensity modulation apparatus of claim 1, wherein the first branch waveguide is implemented by a diffused Y-shaped waveguide, a ridged Y-shaped waveguide, a diffused directional coupled waveguide structure, a ridged directional coupled waveguide structure, a diffused adiabatic coupled waveguide structure, or a ridged adiabatic coupled waveguide structure.

5. The electro-optical intensity modulation apparatus of claim 1, wherein the second branch waveguide is a waveguide beam combining unit, and is implemented by a diffused converged Y-shaped waveguide, a ridged converged Y-shaped waveguide, a diffused directional coupled waveguide structure, a ridged directional coupled waveguide structure, a diffused adiabatic coupled waveguide structure, or a ridged adiabatic coupled waveguide structure.

6. The electro-optical intensity modulation apparatus of claim 1, wherein the electrodes corresponding to the RF conversion push-pull electro-optic phase modulation unit are formed with a topology design of dual-parallel push-pull electrodes with low frequency modulation characteristics, a topology design of an asymmetric push-pull electrodes or a topology design of push-pull coplanar waveguide electrodes with high frequency modulation characteristics.

7. The electro-optical intensity modulation apparatus of claim 1, wherein the electrodes corresponding to the push-pull electro-optic bias control unit are formed with a topology design of dual-parallel push-pull electrodes with low frequency modulation characteristics, a topology design of an asymmetric push-pull electrodes or a topology design of push-pull coplanar waveguide electrodes with high frequency modulation characteristics.

8. The electro-optical intensity modulation apparatus of claim 1, wherein the electrodes corresponding to the two sets of the independent polarization rotation control units, the optical waveguide polarization filter unit and the dual-channel relative light intensity ratio adjustment unit formed with a topology design of dual-parallel push-pull electrodes with low frequency modulation characteristics, a topology design of an asymmetric push-pull electrodes or a topology design of push-pull coplanar waveguide electrodes with high frequency modulation characteristics.

9. The electro-optical intensity modulation apparatus of claim 1, wherein the two sets of the independent polarization rotation control units are implemented by a nonlinear birefringent diffusion waveguide, a ridged waveguide with high polarization selectivity or an asymmetric polarization-selective channel waveguide.

10. The electro-optical intensity modulation apparatus of claim 1, wherein the dual-channel relative light intensity ratio adjustment unit is formed by a polarization-depended differential loss waveguide, a polarization cut-off type waveguide or a high polarization extinction ratio waveguide.

11. The electro-optical intensity modulation apparatus of claim 1, wherein each of the electrodes corresponding to the RF conversion push-pull electro-optic phase modulation unit has an electrode structure with three metal layers.

12. The electro-optical intensity modulation apparatus of claim 1, wherein each of the electrodes corresponding to the push-pull electro-optic bias control unit has an electrode structure with two metal layers.

13. The electro-optical intensity modulation apparatus of claim 1, wherein each of the electrodes corresponding to the two sets of the independent polarization rotation control units, the optical waveguide polarization filter unit and the dual-channel relative light intensity ratio adjustment unit has an electrode structure with two metal layers.

14. The electro-optical intensity modulation apparatus of claim 1, wherein the optical waveguide polarization filter unit is implemented by an optical waveguide with a self-polarizer, wherein the optical waveguide with the self-polarizer is formed by a proton-exchange in a lithium niobate crystal.

15. The electro-optical intensity modulation apparatus of claim 1, wherein the electrodes corresponding to the conversion push-pull electro-optic phase modulation unit and the non-linear optical substrate are provided with a RF area insulation layer therebetween, and the RF area insulation layer is used to adjust a RF equivalent refractive index.

16. The electro-optical intensity modulation apparatus of claim 1, wherein the electrodes corresponding to the two sets of the independent polarization rotation control units, the optical waveguide polarization filter unit and the dual-channel relative light intensity ratio adjustment unit and the non-linear optical substrate are provided with a extinction ratio control area insulation layer therebetween, and the extinction ratio control area insulation layer is used to prevent electrode absorption loss.

17. An electro-optical intensity modulation chip, formed by packaging the electro-optical intensity modulation apparatus of claim 1.

18. An electro-optical intensity modulation system, comprising:
an electro-optical intensity modulation chip, formed by packaging the electro-optical intensity modulation apparatus of claim 1;
a light source providing unit, providing a light source to be modulated to the electro-optical intensity modulation chip;
an electro-optical coupling unit, receiving a modulated output light with a controllable extinction ratio output from the electro-optical intensity modulation chip;
a RF signal source, providing at least one electrical signal for modulating to the RF conversion push-pull electro-optic phase modulation unit;
a bias signal source, providing at least one biasing signal to the push-pull electro-optic bias control unit; and
an extinction ratio control signal source, providing at least one control signal to the two sets of the independent polarization rotation control units and the dual-channel relative light intensity ratio adjustment unit.

19. The electro-optical intensity modulation system of claim 18, wherein the electro-optical coupling unit gives dynamical feedback to the extinction ratio control signal source and the bias signal source.

20. The electro-optical intensity modulation system of claim 18, wherein the light source providing unit and the RF signal source send the light source and the electrical signal synchronously.

* * * * *